United States Patent [19]
Frappart

[11] 4,016,466
[45] Apr. 5, 1977

[54] SUBMINIATURIZED ADJUSTABLE CAPACITOR

[75] Inventor: Pierre Frappart, Montreuil-Sous-Bois, France

[73] Assignee: L.C.C.-C.I.C.E.-Compagnie Europeenne de Composants Electroniques, Paris, France

[22] Filed: Mar. 25, 1975

[21] Appl. No.: 561,703

[30] Foreign Application Priority Data
Mar. 29, 1974 France .............................. 74.11330

[52] U.S. Cl. .............................. 361/278; 361/292
[51] Int. Cl.² .............................................. H01G 5/22
[58] Field of Search .......... 317/249 R, 249 T, 258, 317/247, 249 D, 249 PB; 240/10.68

[56] References Cited
UNITED STATES PATENTS

| | | | |
|---|---|---|---|
| 1,871,048 | 8/1932 | Dublier | 317/249 R |
| 2,475,144 | 7/1949 | Viodama | 317/249 D |
| 3,068,107 | 12/1962 | Levinson | 317/258 X |
| 3,662,166 | 5/1972 | Dietz | 240/10.68 |
| 3,797,630 | 3/1974 | Zilkha | 317/249 R |
| 3,808,556 | 4/1974 | Dome | 317/248 X |

*Primary Examiner*—E. A. Goldberg
*Attorney, Agent, or Firm*—Oblon, Fisher, Spivak, McClelland & Maier

[57] ABSTRACT

A variable capacitor has an elastic conductive electrode. The elastic conductive electrode is capable of reversible deformation to vary the capacitance. The deformation is applied by a screwable adjuster device.

7 Claims, 8 Drawing Figures

SUBMINIATURIZED ADJUSTABLE CAPACITOR

BACKGROUND OF THE INVENTION

The present invention relates to subminiaturised adjustable capacitors. It relates, more particularly, to the kind of capacitor in which the capacitance value can be increased or reduced during adjustment, the final adjusted value being fixed.

Within the field of capacitor types, the present invention is concerned with the category of low-capacitance adjustable capacitors generally used for example for the fine adjustment of the precise frequency of oscillation of an oscillator or of a tuned circuit belonging to an amplifier or a filter.

DESCRIPTION OF PRIOR ART

This category of capacitors comprises in particular trimming and padding capacitors whose rated C.C. voltages do not generally exceed 250 volts and whose capacitance is encountered within a range extending roughly between around 1 picofarad and 500 pF. These capacitors fall into the following kinds:

the "screw" type in which one springy member formed by a flat, conductive, elastic electrode is positioned by means of an insulated adjuster screw, in relation to one face of another fixed, flat, conductive electrode, insulated from the first by an intervening dielectric; the capacitance of the capacitor is adjustable between about 0.5 and 15 pF;

the "tubular" type in which one electrode is constituted by an external metallized surface on an element whose penetration into a tube forming a dielectric wall and having an external metallized surface to form the fixed electrode, is variable; the capacitance seldom exceeds 60 pF the minimum value being around 10% less than the maximum;

the "plate" type in which around half the surface of one ceramic disc is metallized to form an electrode; the maximum capacitance can reach around 500 pF and the minimum is about 20% less than the maximum, adjustment being effected by rotation of one plate on another, with corresponding superimposition of the electrodes.

In addition, mention should be made of the differential type of capacitor and the capacitor which is formed using two twisted, insulated wires.

It should be borne in mind that the design of the plate type ceramic capacitor which offers a substantial capacitance variation and a high maximum capacitance, presents greater difficulties when its dimensions are reduced. In other words, in this case the superimposable surfaces of the capacitor electrodes occupy around half of the plate, the capacitance adjustment can only be carried out with an accuracy corresponding to half a turn of the control spindle and the dielectric is extremely thin and has to present a flat finish in order to prevent the occurence of corrugated spots, thus permitting to increase the capacitance and avoiding the formation of an air layer of irregular thickness which could act as a dielectric between the electrodes.

When the device to which the variable capacitor is to be fitted is relatively very small, for example an electronic watch, where the space available for the arrangement of the capacitor is very restricted, then its design presents problems.

SUMMARY OF THE INVENTION

One object of the present invention is to provide embodiments of a subminiaturised adjustable capacitor of original design which, despite its extremely tiny dimensions, exhibits a relatively large overall variation in capacitance and a fine adjustment so that a final fixed capacitance of stable value can be achieved; in addition, the capacitor does not present certain of the drawbacks of the known prior art embodiments and the law of variation of its capacitance can be determined prior to assembly.

Briefly stated, the adjustable capacitor in accordance with the present invention comprises one electrode made at least partially of an elastic, conductive material presenting in its minimum capacitance configuration, a contact area of reduced size in relation to the other electrode, and another given contact area that of its positions approaching maximum capacitance, the capacitance variation being achieved by the deformation of the conductive surface of the material which is crushed to a variable extent depending upon the pressure applied by an adjusting means.

In accordance with one of the features of the present invention, a subminiaturised adjustable capacitor, comprises two electrodes separated by a dielectric, one of said electrodes having a relative position adjustable under the control of an adjuster means, wherein the conductive means of one said electrode is at least partially made of elastic material presenting one face to the dielectric, the deformation of this face by the adjustment modifying the value of the capacitance.

BRIEF DESCRIPTION OF THE DRAWINGS

Other features and advantages of the invention will become apparent from the ensuing description, given by way of example in reference to the attached drawings where.

Figure 1:
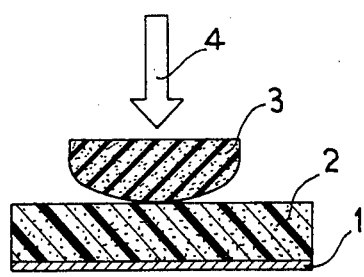
FIGS. 1, 2 and 3 illustrate a schematic view of the basic structures of the capacitor in accordance with the invention.
Figure 2:
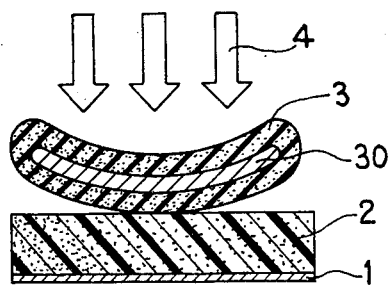
Figure 3:
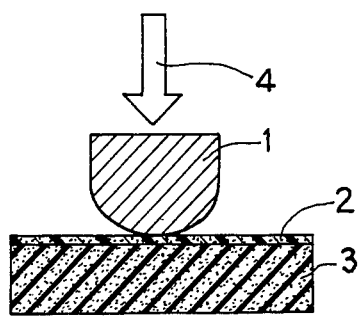

The basic structures of the adjustable capacitor are shown in FIGS. 1, 2 and 3 where similar references signify similar functional elements.

DETAILED DESCRIPTION OF THE PREFERRED EMBODIMENTS

Thus, the reference 1 represents one of the two electrodes, advantageously the fixed one, the reference 2 represents the dielectric, the reference 3 represents the second electrode, made of an elastic, conductive material, and the reference 4 represents the adjuster means which is applied to one of the electrodes.

In FIG. 1, the fixed electrode 1 is flat and a rigid dielectric 2 is superimposed on it; the elastic, conductive electrode 3 is of hemispherical shape and at a point in its surface is tangential to the surface of the dielectric 2 in the position of minimum capacitance. Under the action of the adjuster means 4, a pressure acting in the direction perpendicular to the surface of the dielectric 2 is applied to the flat surface of the electrode 3. The pressure crushes the electrode 3 and the spherical surface begins to distort and spread over the dielectric surface 2, thus modifying the capacitance of the variable capacitor.

FIG. 2 illustrates a variant of the basic embodiment of FIG. 1; it differs in terms of the fact that the elastic electrode is constituted by a metal or plastic elastic component 30 within a coating of elastic conductive material 3 deformable by the pressure which the adjuster means 4 applies.

FIG. 3 illustrates another variant embodiment in which a rigid electrode 1, under the action of the adjuster means 4, exerts a pressure on a flat, deformable dielectric 2 arranged upon one face of an elastic, conductive electrode 3. Under the effect of this pressure, the assembly constituted by the elements 2 and 3 is deformed and takes up the shape, advantageously rounded, of the rigid electrode 1. The variation in the capacitance of the capacitor depends upon the pressure exerted by the adjuster means 4 upon the electrode 1.

It should be noted that the component elements referred to hereinbefore can be manufactured differently, primarily as a function of the material utilised.

The conductive mass of the non-deformable electrode 1 will be constituted for example by a conductive metal such as brass, copper or silver to form the electrode or again may take the form of a conductive metal layer, advantageously silver, deposited directly upon one of the faces of the dielectric, the latter advantageously a ceramic material.

In this case, the layer will be formed upon a rigid dielectric of desired shape. The form given to the electrode depends upon the design chosen and may, for example, be rectangular, square or circular with at least one flat or spherical face. This electrode will advantageously comprise means for the assembly and/or attachment of the capacitor on or to an associated circuit.

The dielectric 2, depending upon the case, will be made either of a rigid material, advantageously ceramic, or a deformable material such as a plastic having a dielectric constant of low value. A metal oxide such as tantalum oxide produced by anodic oxidation, or silicon oxide produced by thermic oxidation, may be used in certain circumstances to constitute the rigid dielectric.

The dielectric material is chosen as a function of the desired dielectric constant, generally ranging between $K = 2$ for teflon and $k = 11$ for tantalum oxide, and even up to $k = 120$ for titanium dioxide or any compound forming a ceramic dielectric material. If the dielectric is to have a shape which can be modified under the effect of the pressure applied, then the material will be chosen to present the desired flexibility. In addition, the choice of the dielectric material depends upon the desired temperature compensation characteristics and upon the range of working temperatures.

The electrode 3, which makes it possible to adjust the capacitance of the capacitor, is constituted by an elastic, conductive mass advantageously deformable by the application of a pressure and possibly by a tractive effort. The desired characteristic of this mass is an elastic flexibility which makes it possible to modify at least one of its faces under the effect of pressure, this face progressively regaining its initial shape as the pressure applied by the adjuster means diminishes.

The elastic material utilised to produce this electrode 3 will, for example, be one of the rubbers which has been rendered conductive or carries a conductive coating.

In certain cases it is advantageous that the elastic material should be relatively soft in order for example to present less resistance to deformation; the highest elasticity in this conductive mass is achieved by reinforcing it with a metal or plastic component 30 embedded within it.

Two examples of bowed elastic electrodes capable of being flattened on to a flat dielectric, have been shown in FIGS. 1 and 2.

The utilisation of an elastic material makes it possible to employ a generally flat ceramic dielectric, that of whose faces which is in contact with an electrode being in a non-dressed state after baking, and this representing a clear advantage from the industrial point of view.

The adjuster means 4 will advantageously be constituted by an element bearing against one of the faces of one of the two electrodes in order to apply to same, directly or through an intermediate component, a pressure produced for example by the operation of an adjuster screw. This control means will possibly be constituted by a component whose adjusted positions are achieved by penetration or under the effect of the adjustable strain of a spring.

Moreover, each electrode 1 and 3 is respectively attached to an electrical lead comprising, towards that of its ends at which it is connected to an associated circuit, a folded section which improves its flexibility.

It will be observed that in the aforementioned basic structures, only one electrode is made of a ceramic material, the elasticity of the other electrode and that imparted to the electrical leads, preventing the occurence of the kind of fragility encountered in the prior art designs. The capacitors in accordance with the invention will readily withstand vibrations, shock loading or even severe accelerations; moreover, stresses of this kind have no effect upon the value of the adjusted capacitance produced after the immobilization of the adjuster means 4, this latter situation being for example produced by the use of a small blod of cement or paint.

Having thus defined the basic design of the adjustable capacitor in accordance with the invention, as well as that of its main component elements, preferred embodiments will now be discussed.

Figure 4:
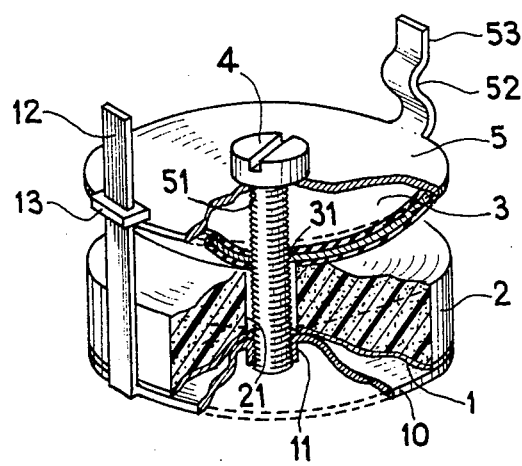
FIG. 4 is a cut-away and partially exploded view of a preferred embodiment of the capacitor in accordance with the invention.

A first example is shown in cut-away fashion, partially exploded, in FIG. 4. This embodiment corresponds to a basic structure very similar to that shown in FIG. 2.

From an examination of this figure, working from bottom to top in the drawing, there will be appreciated in succession:

a metal lead 12 comprising a plate 10 of sufficient thickness to be capable of containing an opening 11 at its centre; this opening is produced by a punching operation in order to cooperate with the threads of an adjuster screw 4 whilst in other embodiments this opening 11 is threaded;

on said plate 10 there is arranged a dielectric disc 2 equipped with a central opening 21 to pass the adjuster screw 4. That face of the disc resting upon the plate 10 is metallized and constitutes the fixed electrode 1. This dielectric disc is made of rough-baked ceramic having a thickness of around 10.4mm, an external diameter of around 5 mm and an opening diameter (opening 21) of around 1.2 mm;

the deformable electrode 3 takes the form of a dish the base of which contains an opening 31. This dish is constituted by a metal washer with divergent elastic spokes, which is embedded in a conductive rubber; it is to the rubber that the contacts are established, on the one hand at the circumference of the opening 31 with the dielectric 2, and on the other at the circumference of the rim of the dish with an electrical lead 5;

the lead 5 is constituted by a plate containing a central hole 51 and extended by a lead 53 containing a folded section 52 in order to give it greater elasticity during the course of displacement. The thickness of the plate 5 is such that a pressure applied by the adjuster means 4 and transmitted to the edge of the dish forming the electrode 3, distorts it and applies its conductive mass against the fixed electrode 1;

this adjuster means 4 is constituted by a screw of insulating material, for example nylon, having a diameter and a pitch matching the opening 11 in the plate 10.

Considering FIG. 4, it will be seen that the adjustment of the capacitance is primarily effected by modifying the electrode interface distance, that is to say by moving the internal surface of the elastic electrode 3 towards or away from the surface of the dielectric 2 arranged through its electrode 1 on the connecting plate 10, this modifying the abutment area which defines the major proportion of the capacitance. This displacement is effected under the action of the plate 5 whose spacing in relation to the fixed electrode 1 is determined by the number of turns which the adjuster screw 4 performs; the fineness of adjustment depends upon the screw pitch.

An insulating component 13 is slideably assembled on the lead 12, this component being fixed to the plate 5 and being designed to relatively locate the plates 10 and 5. The ends of these leads, visible in the top half of FIG. 4, are designed for connection of these components with the elements of an associated circuit.

The adjustable capacitor in accordance with the described embodiment, is distinguished by the simplicity of the components utilised and of their assembly, which is manifested by an advantageous manufacturing cost; in addition, its design makes it possible to design a subminiaturised capacitor having dimensions such that it can be used in extremely restricted spaces, as for example inside an electronic watch.

In a variant embodiment which has not been shown, the dielectric in the form of a ceramic disc 2 is not used. In this variant embodiment, the bowed surface deformable electrode 3 is coated with a very thin deformable dielectric, for example PARYLENE; the variation in capacitance is effected in a manner similar to that shown in FIG. 4.

Figure 5:
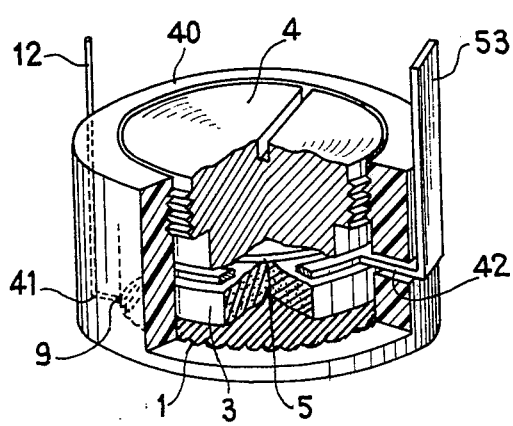
FIG. 5 is a cut-away and partially exploded view of a variant embodiment of the capacitor in accordance with the invention.

FIG. 5 illustrates a variant embodiment; this variant is both more elaborate and simpler.

The capacitor is assembled in a cylindrical casing 40 the cover of which is constituted by the adjuster means 4 of insulating material. At the bottom of the casing there is arranged a wire 1 folded zig-zag fashion in order to cover the base of the casing and thus constitute a surface disposed towards the other electrode 3. This wire 1 is a tantalum wire whose surface is covered with tantalum oxide constituting the dielectric. To the core 9 of one end of the wire there is connected by a conductive cement, an output lead 12; this lead leaves the casing 40 through an opening 41. The deformable electrode 3 of elastic and advantageously conductive material, is formed by a plate arranged upon the surface constituted by the tantalum oxide layer on the wire 1; this plate 3 has its top (in the drawing) surface covered with a conductive layer. Between said surface and the flat surface of the end of a screw 4, there is arranged an output lead 5 passing through the wall of the casing 40 through another opening 42. This lead 53 comprises a flat section forming a plate 5 upon which the flat surface of the screw 4 bears. It is by rotating this screw that adjustment of the capacitance is achieved.

It will be observed that the adjuster screw 4 also does duty as a cover for the casing 40, this cover being designed to be screwed in position either by threading on the inside of the casing walls or on the outside.

Figure 6:
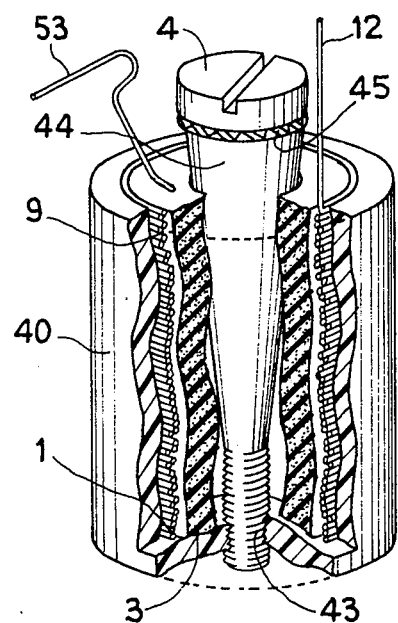
FIG. 6 is a variant embodiment of FIG. 5.

FIG. 6 illustrates a variant on the embodiment of FIG. 5, in which the two electrodes are tubular and concentric in form. In this embodiment, the base of the insulating casing 40 contains a threaded hole 43 for the adjuster screw 4 which is likewise of insulating material. Into the casing 40 the tantalum wire 1 is introduced in the form of a coil with contiguous turns, the core of one end of the wire being connected to an outut lead 12. Between the turns and the adjuster screw 4 there is arranged the deformable conductor material 3, which has an output lead 53; part of the screw 4, which is screwed into the threads 43, has a constant diameter whilst on the other part of the screw there is assembled a component 44 which has a diameter that increases up to a washer 45 independent of the head of the screw, in such a fashion that the penetration of the screw crushes the deformable electrode 3 and thus modifies the capacitance.

In accordance with another embodiment, not shown in the drawings, the tantalum wire is arranged inside the casing 40 in order to form a variable-pitch helix. The adjuster means 4 then comprises a screw section of deformable material which incapsulates a central metal portion terminating in the head of the adjuster screw. This head is connected to a lead wire containing a number of turns so that the adjuster screw can be screwed in and out without any inconvenience, thus modifying the capacitance of the capacitor by penetration of the screw.

Figure 7:
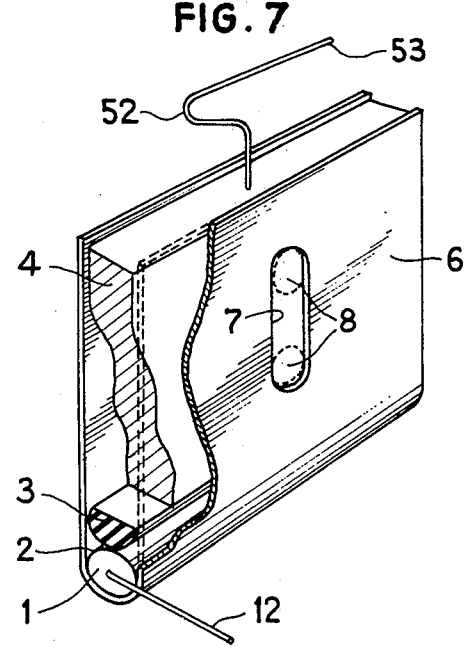
FIG. 7 is a cut-away view of another variant embodiment of the capacitor in accordance with the invention.

Yet another embodiment is shown in a cut-away view illustrated in FIG. 7. In this embodiment, likewise a tantalum wire is used as the fixed electrode 1, the dielectric 2 being tantalum oxide produced by electrolysis at the surface of the wire. This electrode is connected to a lead 12 which is stuck to the core of the wire using a conductive cement. The assembly element is a plate 6 folded U-fashion to form elongated arms between which there can be introduced in force-fitted fashion a component 4 which is thus firmly trapped by friction within the component 6. The component 4 and 6 will be made for example of plastic. Between the adjuster component 4 and the tantalum wire 1 arranged on the base of the U, there is located the deformable conductive material 3 which is connected to a metallic insert forming a lead 53. This lead is provided with a folded section at 52 enabling the component 4 to displace without transmitting any effort to the lead 53. One side of the component 6 and the corresponding side of the component 4, contain staggered openings 7 and 8 enabling the capacitance to be adjusted by the crushing of the deformable electrode 3.

By a choice of materials and of protective arrangments of the tantalum oxide layer on the wire 1, doing duty as dielectric, an embodiment suitable for mass production is possible; in this case, a certain number of parallel capacitors are manufactured in a strip which will subsequently be cut into several elementary capacitors.

Figure 8:
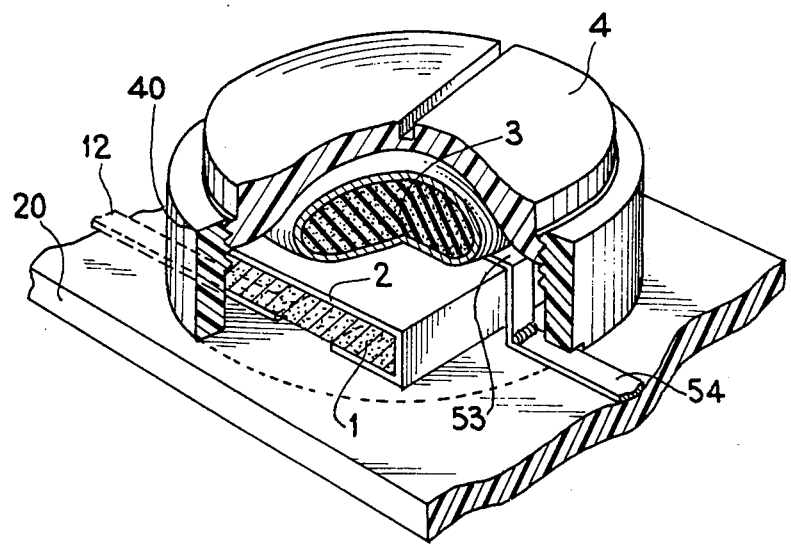
FIG. 8 is a cut-away partially exploded view of the capacitor in a preferred embodiment for microelectronic circuits.

The preferred embodiment of the variable capacitor for use with circuits manufactured in accordance with the microelectronic technique, has been shown in FIG. 8. The capacitor is formed for example upon a substrate 20 of a hybrid circuit and on this substrate there have been provided two conductive tracks 12 and 54. To the track 12 constituting a first output and to the substrate 20, there is stuck using an adhesive cement a plate of silicon constituting the electrode 1. This plate has its surface covered with silicon oxide except at the point of contact with the track 12 and this oxidised surface constitutes the dielectric 2. On the dielectric 2, at the side opposite that which is in contact with the track 12, there is arranged a contact lead 53 connected to the track 54 which constitutes a second output. This lead 53 establishes contact with the deformable electrode 3 and its area is made as small as possible in order to minimize the residual capacitance of the capacitor.

The deformable electrode 3 is constituted by a lenticular component, spherical or flattened, of conductive elastic material or equipped with a conductive coating, which is capable of being spread out over the dielectric 2 under the effect of the pressure exerted by an adjuster means 4. This adjuster means 4 is constituted by the cover which can be screwed into or out of threads provided inside or outside a cylinder of insulating plastic material stuck using insulating cement to the substrate 20 around the plate 1.

By way of example, the dimensions of the kind of capacitor illustrated in FIG. 4 are approximately 2.5 mm in height and 5 mm in diameter; its technical specifications are substantially:

capacitance variable between 8 and 40 pF approximately;

operating temperature range: −20° to ±70° C;

type of dielectric ceramic having a dielectric constant of 600 and a determinate temperature coefficient.

Of course, the invention is not limited to the embodiment described and shown which was given solely by way of example.

What is claimed as new and desired to be secured by Letters Patent of the United States is:

1. A subminiaturized adjustable capacitor comprising:
    a first electrode having a fixed non-deformable surface;
    a dielectric superimposed on the first electrode;
    a second electrode having a conductive mass composed at least partially of a non-metallic elastic material, the conductive mass being provided with a resilient reinforcement and with only a portion of the conductive mass being in contact with the dielectric at the minimum capacitive value;
    adjuster means for controllably applying pressure to progressively deform the conductive mass of the second electrode and bring larger portions thereof into contact with the dielectric, whereby the capacitance of the capacitor can be made to vary continuously between a minimum value and a maximum value; and
    a movable non-deformable plate separated from the first electrode by the dielectric and the second electrode and responsive to the controllable application of pressure by the adjuster means for movement in a direction perpendicular to the fixed non-deformable surface of the first electrode.

2. A subminiaturized adjustable capacitor comprising:
    a fixed conducting plate having an aperture and a first output lead;
    a ceramic dielectric disc having a central aperture and a face in contact with the fixed conducting plate;
    a first electrode having a fixed non-deformable surface, the first electrode being a metallized coating on the face of the ceramic dielectric disc in contact with the fixed conducting plate;
    a second electrode having a conductive mass composed at least partially of a non-metallic elastic material, the conductive mass having only a portion thereof in contact with the dielectric at the minimum capacitive value, the second electrode being a convex plate having a central portion in contact with the dielectric and a central aperture;
    adjuster means for controllably applying pressure to progressively deform the conductive mass of the second electrode and bring larger portions thereof into contact with the ceramic dielectric disc, whereby the capacitance of the capacitor can be made to vary continuously between a minimum value and a maximum value; and
    a movable non-deformable plate contacting the rim of the convex plate and responsive to the controllable application of pressure by the adjuster means for movement in a direction perpendicular to the fixed non-deformable surface of the first electrode, the movable non-deformable plate having a central aperture and a second output lead with a folded portion;
    wherein the adjuster means includes an insulated screw passing through each of the central apertures of the movable non-deformable plate, the second electrode and the ceramic dielectric disc respectively and screwed into the aperture of the fixed conducting plate.

3. The capacitor recited in claim 1 wherein:
    the first electrode is metallized and is connected to a first output lead.

4. The capacitor recited in claim 1 wherein:
    the dielectric is a ceramic material.

5. The capacitor recited in claim 1 wherein:
    the second electrode includes a rubber element rendered conducting by the addition of a conductive material.

6. The capacitor recited in claim 1 including a first output lead connected to the first electrode and a second output lead connected to the second electrode wherein the first and second output leads include contact plates, one of the output leads being provided with a folded portion for flexible connection wiring.

7. The capacitor recited in claim 1 wherein the adjuster means includes a screw operatively engaging the movable nondeformable plate.

* * * * *